United States Patent [19]

Limbach, 2nd et al.

[11] 4,177,567
[45] Dec. 11, 1979

[54] TRACER HEAD

[75] Inventors: Walter S. Limbach, 2nd, Eighty-four; Jon R. Swoager; James M. Swoager, both of Imperial, all of Pa.

[73] Assignee: Automation Equipment Inc., Pittsburgh, Pa.

[21] Appl. No.: 965,399

[22] Filed: Dec. 1, 1978

Related U.S. Application Data

[63] Continuation of Ser. No. 762,523, Jan. 26, 1977, abandoned.

[51] Int. Cl.² ............... B43L 13/10; H01F 21/06
[52] U.S. Cl. ............... 33/23 K; 33/174 L; 336/30; 336/135
[58] Field of Search ............ 336/30, 130, 132, 135; 90/62 R; 33/23 K, 169 R, 172 E, 174 L

[56] References Cited

U.S. PATENT DOCUMENTS

| | | | |
|---|---|---|---|
| 2,552,722 | 5/1951 | King | 336/135 |
| 2,839,733 | 6/1958 | Bassett | 336/30 |
| 2,864,066 | 12/1958 | Egbert et al. | 336/30 X |
| 2,899,653 | 8/1959 | Capron | 33/172 E X |
| 2,937,577 | 5/1960 | Morgan, Jr. | 336/30 X |
| 2,979,959 | 4/1961 | Clurman | 336/30 X |
| 3,145,623 | 8/1964 | Fillmore et al. | 33/23 K |
| 3,251,013 | 5/1966 | Klein et al. | 336/30 |
| 3,331,971 | 7/1967 | Möller | 336/135 |
| 3,845,561 | 11/1974 | Elsdoerfer | 33/169 R |

Primary Examiner—Thomas J. Kozma
Attorney, Agent, or Firm—Webb, Burden, Robinson & Webb

[57] ABSTRACT

This disclosure relates to a novel tracer head comprising a stylus, stylus support and housing, and two perpendicular differential transformers. The stylus has a unique configuration enabling more precise memory of its null position when the stylus is not deflected. Further, the stylus has a rotating top pin for contacting the pattern or template that assures a condition assumed in tracer control systems but not achieved under all conditions, i.e., the stylus will deflect away from the template normal to the template edge.

3 Claims, 8 Drawing Figures

TRACER HEAD

This is a continuation of application Ser. No. 762,523, filed Jan. 26, 1977, now abandoned.

BACKGROUND

This invention relates to tracer heads for tracer control systems. In a typical tracer control system, a tracer head supporting a stylus is moved relative to the edge of a fixed template upon which the stylus bears. The tracer head may be fixed relative to a tool which moves with it to machine a workpiece fixed relative to the template.

The stylus bearing upon the template edge is assumed to be deflected away from the template edge normal thereto. In other words, the stylus deflection is assumed to be perpendicular to a tangent to the template edge at the point where the stylus bears upon the template. Typically, tracer control systems convert the tracer deflection into x and y deflection signals which are proportional to the components of the deflection vector. These signals are used to control the x-y drive that moves the tracer head relative to the template. (See U.S. Pat. No. 2,839,733).

Briefly according to this invention there is provided a tracer head comprising a base adapted to be mounted to an x-y drive. A frame extends from the base upon which are mounted two perpendicular differential transformers. A stylus is mounted to the base and extends away therefrom through the differential transformers. A deflection of the unfastened end of the stylus as it bears upon the template will change the output of the differential transformers. According to this invention, the stylus comprises an elongate solid cylindrical rod having, near its base, an integral flared skirt, which skirt has a smooth and consistent tangency with the cylindrical wall of the stylus. The skirt comprises an integral 360° restoring spring for returning the stylus after deflection to its null position.

According to preferred embodiments, the ratio of the diameter of the base of the skirt to the diameter of the rod of the stylus is between 4:1 and 1.5:1, and the ratio of the diameter of the base to the axial distance between the base and the point of tangency is between 1:0.75 and 1:2. It is preferred that the rod is made of a magnetic chrome vanadium steel or 416 stainless steel. The standard composition of 416 stainless steel is 0.15 maximum percent by weight carbon, 1.25 percent manganese, 1 percent silicon, 12 to 14 percent chromium, 0.15 minimum percent sulfur, 0.06 maximum percent phosphorus and ramainder iron. See page 409 of *Metals Handbook Volume 1, 8th Edition* (1961) published by The American Society of Metals. It is yet another preferred feature of this invention that the stylus has a ball bearing mounted rotary tip rotatable upon the axis aligned with the axis of the stylus, which tip bears upon the template edge. It is yet another preferred feature of this invention that the differential transformers have E-shaped cores with one transformer coil mounted on the center leg and coils of the the opposed transformer, i.e., the differential transformer mounted on the outside legs of the core.

Further features and other objects and advantages of this invention will become clear by reading the following detailed description made with reference to the drawings in which.

Figure 1:
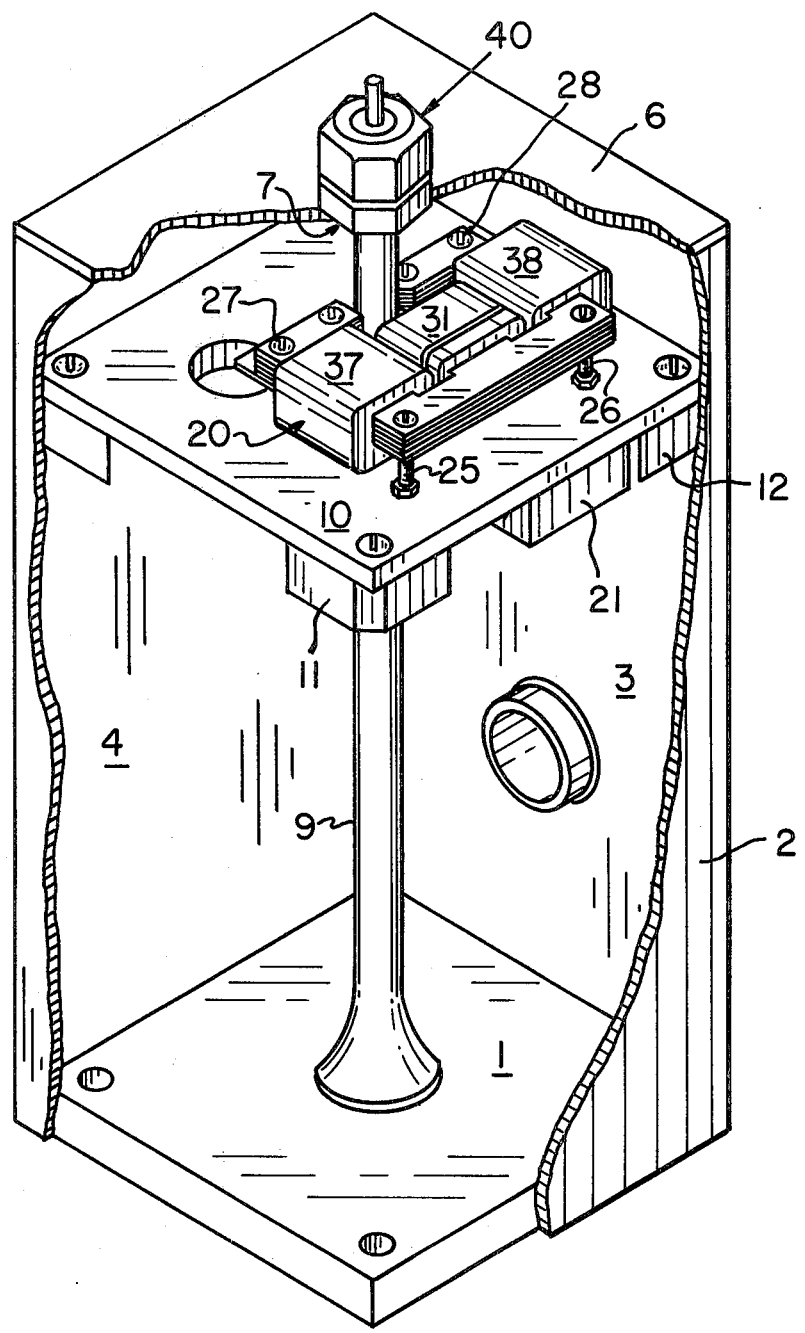
FIG. 1 is an overall perspective view of the stylus head according to this invention without the electrical wiring shown.
Figure 3:
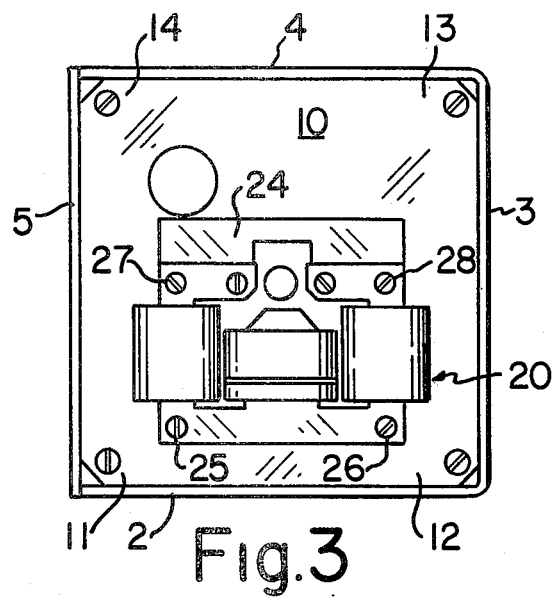
FIG. 3 is a top view of a tracer head according to this invention from which the top plate has been removed.
Figure 2:
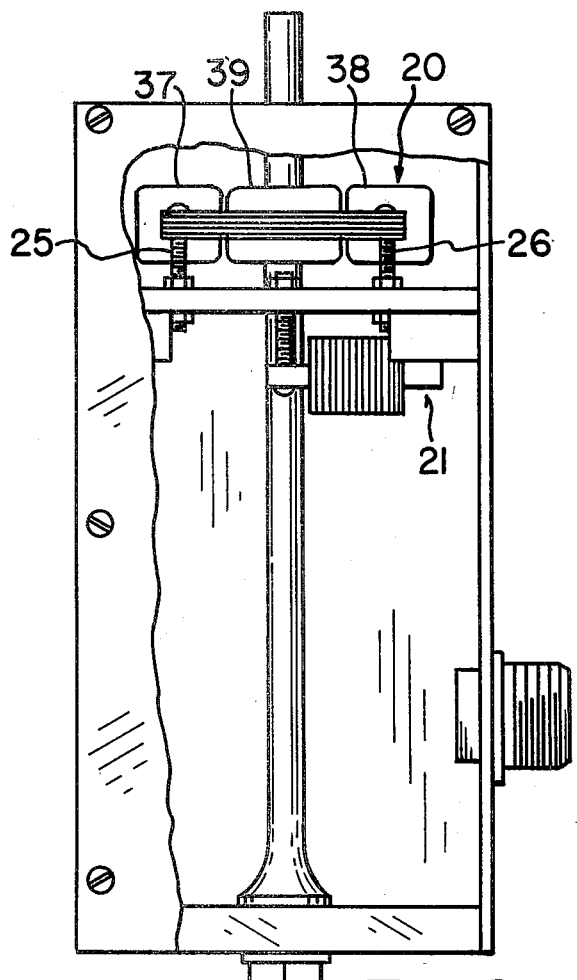
FIG. 2 is a side view of a stylus head according to this invention without the rotary tip shown.

Referring now to FIGS. 1, 2 and 3 there is shown a tracer head assembly having a base 1 made, for example, of aluminum. Extending from the base are walls 2, 3, 4 and 5 (not shown) which may, for example, be made from aluminum. Atop the walls sits a cover 6, for example, aluminum. The cover has an opening therein 7 which enables the stylus 9 to extend therethrough. The stylus 9 is secured to the base and passes up through the opening in the cover. Intermediate the base 1 and the cover 6 is an aluminum mounting plate 10 which is secured by four mounting plate supports 11, 12, 13 and 14, also aluminum or nonmagnetic metal. Differential transformer assemblies 20 and 21 are mounted above and below the mounting plate respectively.

Figure 5:
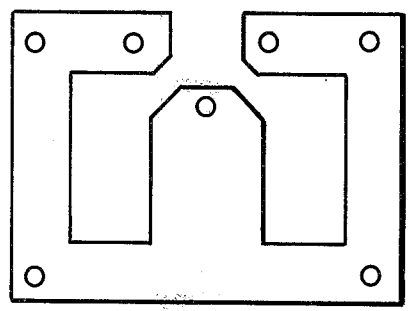
FIGS. 5, 6 and 7 illustrate the differential transformer core construction.
Figure 8:
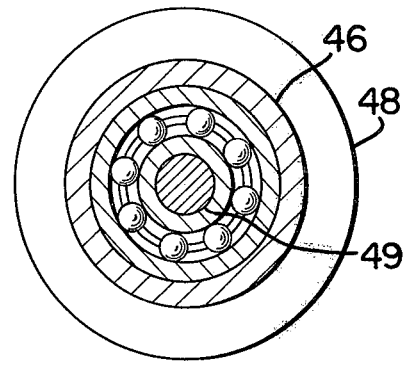
FIG. 8 is a section view taken along line VIII—VIII of FIG. 4.
Figure 6:
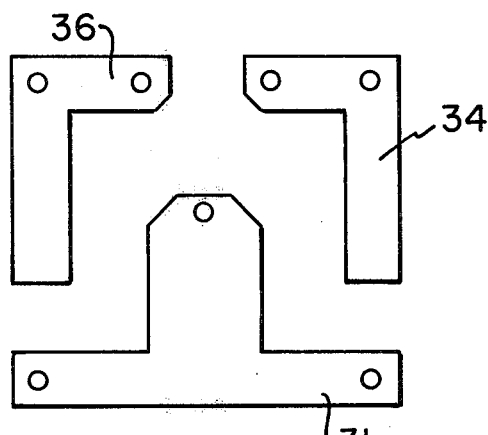
Figure 7:
Figure 7:
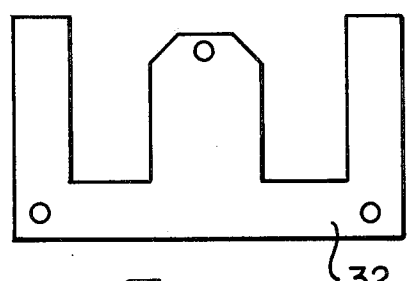

The differential transformers have a core having an E-shaped configuration made of laminated, magnetic stampings, for example 0.006 inches thick stampings stacked to ¼ inch. The laminations are preferrably grain oriented silcon steel alloy. According to a preferred embodiment of this invention, the cores are fabricated to have a overall configuration as shown in FIG. 5. The outer legs of the E-shaped core have short portions extending toward each other and pointing to the null position of the stylus. The cores are constructed of stampings having the configurations shown in FIGS. 6 and 7. Laminations 31 and 32 are assemblied and laminations 33, 34, 35 and 36 are also assemblied and bolted together through the holes as indicated in FIGS. 6 and 7. The transformers are emplaced and then the two portions of the laminated core are interleaved and secured together by an epoxy resin. A nonmagnetic material, for example, plexiglass is installed as a rigidity brace 24 across the sensing gap.

The E-shaped cores are secured above and below the support plate 10 by bolts 25, 26, 27 and 28. Differential transformer coils 37 and 38 are identical and are secured on the outer legs of the E-shaped core. On the inner leg of the E-shaped core is coil 39. Of course, both differential transformer assemblies are identical. They are, however, orientated perpendicular to one another.

The stylus is preferably 416 stainless steel and has a shank diameter of, for example, ⅜ inches and a flared skirt tangent to the shank about 1 inch above the base of the skirt. The base of the skirt rests upon the base of the tracer head 1. The stylus has a portion of, for example, ¼ inch in diameter passing through a hole provided therefore in the base and having a threaded extension to which a nut may be placed securing the stylus to the base. In the particular stylus shown in the drawings, which stylus has been found extremely suitable according to this invention, the radius of curvature of the skirt is 1½ inches and has a center lying in a plane perpendicular to the axis of the stylus approximately 1 inch above the base, i.e., in the plane intersecting the tangent.

Figure 4:
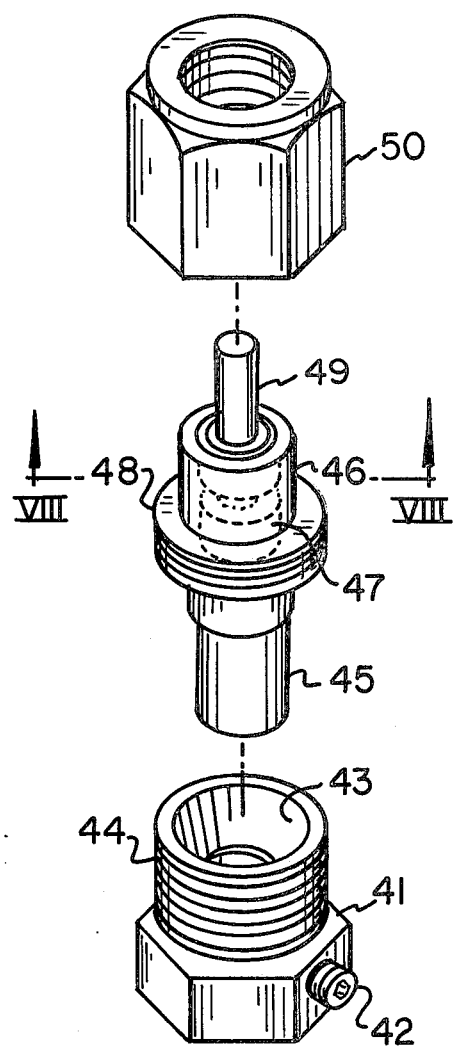
FIG. 4 is an exploded view of the stylus pin assembly in perspective.

A rotary template follower 40 is secured to the upper end or the unsecured end of the stylus. Referring to FIG. 4 there is shown an exploded view of the rotary bearing member. The sleeve 41 has a hole in the bottom thereof enabling it to just slide over the probe. Set screw 42 secures the sleeve to the stylus. The sleeve has provided therein a seat 43 and external threads 44. A bearing member 45 made with great precision has a seat portion in which the outer races of ball bearings 46 and 47 are pressed. The bearing member also has external threads 48. A rotary template follower or pin 49 is secured to the inner race of the ball bearings 46 and 47. Nut 50 is arranged to secure the bearing member to the sleeve. Nut 50 has internal threads not shown.

The tracer head described herein enables improved tracer control because it obtains the two conditions assumed by most all tracer controls systems, namely, that the stylus will always return to its null or reference axis when not in contact with the template and that when in contact with the template the tracer stylus is always deflected normal to the template surface. Prior art tracer heads have attempted to insure the return of the tracer stylus to the reference axis by a system of external springs attached to the stylus which springs are attached at their opposite end to walls of the tracer head. Unfortunately, any force exterted on the walls of the tracer head have the effect of moving the differential transformers relative to the base and therefore disrupting the accuracy of the results obtained. Further, the external springs simply do not restore the tracer nor can they have a 360° restoring bias.

The rotary template follower removes the heretofore unrecognized drag effect on the stylus as it moves along the template edge. The drag heretofore deflected the stylus opposite the direction in which it was traversing. This deflection causes havoc with the control system as it, in many cases, signals the control system to drive somewhat away from the template edge. Applicants have found that only by using a ball bearing mounted rotary tracer stylus can the precision and accuracy necessary for accurate tracing be achieved. Any eccentricity in the rotary stylus would be detected by the differential transformers due to a change in the deflection of the tracer probe. Prior tracer heads to applicants' knowledge have simply not used a rotary template follower.

Applicants' invention is, in certain preferred embodiments, related to the configuration of the E-core for the differential transformer and their mounting relative to the probe. However, the applicants' invention is not directed to the details of the electrical circuit used with the tracer probe and these circuits are well known. A differential transformer produces an electrical output voltage proportional to the displacement of the core (here the stylus). The primary winding is energized with alternating currents. The two secondary windings are connected in series opposition so that the transformer output is the difference of the two secondary voltages. For some central position of the core, the two secondary voltages are equal and the transformer output is zero. This is the balanced or null position. When the core is displaced from the null point, the mutal inductance between the primary and the two secondaries changes. The two secondary voltages are no longer alike and the transformer produces a differential output voltage. With proper design, the output voltage varies linearly with the core positioned over a small range. Motion of the core in the opposite direction produces a similar effect with 180° phase reversal of the alternating output voltage. The outputs must be demodulated in order to produce a d.c. signal indicative of displacement.

Having thus explained our invention with the detail and particularity as required by the Patent Laws, what is desired protected by Letters Patent is set forth in the following claims.

We claim:

1. A tracer head comprising a base, a stylus mounted to the base and extending away therefrom for engagement with the edge of a template, means for detecting deflection of the unfastened end of the stylus, the improvement comprising:

said stylus being an elongate solid cylindrical rod having near its base an integral flared skirt having a smooth and consistent tangency with the cylindrical wall of the stylus, the ratio of the diameter of the base of the skirt to the diameter of the rod being between 4:1 and 1.5:1 and the ratio of the diameter of the base to the axial distance between the base and the point of tangency being between 1:0.75 and 1:2, so that the skirt comprises an integral 360 degree restoring spring for returning the rod after deflection to its null position.

2. The tracer head according to claim 1 wherein the rod is made from magnetic chrome vanadium steel.

3. The tracer head according to claim 1 wherein the rod is made from 416 stainless steel.

* * * * *